(12) United States Patent
Mandler et al.

(10) Patent No.: US 6,820,122 B1
(45) Date of Patent: Nov. 16, 2004

(54) MAINTENANCE OF FREE RESOURCE INFORMATION IN A DISTRIBUTED SYSTEM

(75) Inventors: Benjamin Mandler, Zichron Yaskov (IL); Roger Lee Haskin, Morgan Hill, CA (US); Frank Bernhard Schmuck, Campbell, CA (US); James Christopher Wyllie, Monte Sereno, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/480,446

(22) Filed: Jan. 10, 2000

Related U.S. Application Data

(63) Continuation-in-part of application No. 08/893,644, filed on Jul. 11, 1997, now Pat. No. 6,032,216.

(51) Int. Cl.[7] .......................... G08F 9/00; G08F 15/173
(52) U.S. Cl. ........................ 709/226; 718/104; 707/205
(58) Field of Search ........................ 709/226; 707/8–10, 707/205

(56) References Cited

U.S. PATENT DOCUMENTS

| | | | | |
|---|---|---|---|---|
| 5,349,682 A | * | 9/1994 | Rosenberry | 709/102 |
| 5,940,838 A | | 8/1999 | Schmuck et al. | |
| 6,032,216 A | | 2/2000 | Schmuck et al. | |
| 6,101,508 A | * | 8/2000 | Wolff | 709/223 |
| 6,415,373 B1 | * | 7/2002 | Peters et al. | 711/167 |
| 6,505,217 B1 | * | 1/2003 | Venkatraman et al. | 707/205 |

OTHER PUBLICATIONS

Shared Resource Management, IBM Technical Disclosure Bulletin, vol. 24, No. 2, pp. 1051–1052, Jul. 1981.*

Selecting Data Storage Volumes for Data Sets, IBM Technical Disclosure Bulletin, vol. 25, No. 5, pp. 2490–2491, Oct. 1982.*

Updating Free–Space Allocation Records in OS/2 Dbm Table Data Files, IBM Technical Disclosure Bulletin, vol. 33, No. 6A, pp. 200–201, Nov. 1990.*

* cited by examiner

*Primary Examiner*—Larry D. Donaghue
(74) *Attorney, Agent, or Firm*—Darby & Darby

(57) ABSTRACT

A method for managing a shared resource that is allocated among nodes in a distributed computing system includes receiving periodic reports from the nodes regarding their respective allocations of the resource. Responsive to the periodic reports, an approximate amount of the resource that is free for further allocation is determined. Typically, the shared resource is a data storage resource, such as a plurality of disks linked to the nodes by a network, which disks are commonly accessible to multiple ones of the nodes.

31 Claims, 2 Drawing Sheets

MAINTENANCE OF FREE RESOURCE INFORMATION IN A DISTRIBUTED SYSTEM

CROSS-REFERENCE TO RELATED APPLICATIONS

This patent application is a Continuation-in-Part of U.S. patent application Ser. No. 08/893,644, filed Jul. 11, 1997, now U.S. Pat. No. 6,032,216, which is incorporated herein by reference.

FIELD OF THE INVENTION

The present invention relates generally to distributed computing systems, and specifically to management of shared resources in such systems.

BACKGROUND OF THE INVENTION

Distributed computing systems, in which multiple computers share in the use of system resources, such as disk storage, are known in the art. Shared disk file systems are software components that enable multiple computers in a distributed computing system to access one or more disks at the same time, while sharing in the tasks of managing file system metadata relating to these disks. U.S. Pat. No. 5,940,838, whose disclosure is incorporated herein by reference, and the above-mentioned U.S. patent application Ser. No. 08/893,644 describe in detail both shared disk file systems generally and a particular implementation of such a system that can be used advantageously in conjunction with the present invention. In this implementation, all of the computers have independent access to all of the disks, subject to a global locking mechanism that prevents any of the computers from attempting to access a region of a disk that is currently controlled by another computer in a conflicting mode. A shared disk file system of this type is the IBM General Parallel File System (GPFS) for the RS/6000 SP computer system.

When one of the computers, referred to hereinafter as a node, requires allocation of additional disk space for storage, it must first find a region with sufficient free space for the data to be stored. Every time one of the nodes allocates disk space for its storage requirements or de-allocates unneeded disk space, there is a change in the total amount and distribution of free disk space in the system, referred to hereinafter as the "free information" of the system. In order to choose the appropriate region from which to take its allocation of disk space, and to be assured that there will be sufficient storage available for its current needs, the node must have an updated view of the free information. There are a number of ways in which the node can acquire this free information:

The node can collect the free information from all of the other nodes. This method, however, entails severe performance penalties, since it will lead to frequent disruptions of all of the disk allocation work going on throughout the system and will create communication bottlenecks.

Whenever any node allocates or de-allocates disk space, it can send a message to all of the other nodes that have indicated an interest in this information. Each node then keeps its own records of free information through the system. This method will also lead to excessive communications traffic and waste of storage space due to duplication of the free information.

The communications burden associated with either of these methods will grow quadratically as the number of nodes in the system is scaled up.

The above-mentioned U.S. Pat. No. 5,940,838 suggests an alternative solution, in which an allocation manager component keeps loose track of which node (if any) is using each allocation region and approximately how much free space remains in each region. During initialization of the file system, the allocation manager examines each region to count the number of free blocks in each, and keeps this information in a table. Before switching to a new region, a node sends a message to the allocation manager to obtain a suggested region to which it should switch. At appropriate times, the node sends notification to the allocation manager of the node's activities in all storage regions on which it has acted since the preceding notification, indicating the present amount of free space in the regions. These activities typically include allocation/deallocation and gain or loss of "ownership." The allocation manager updates its table to indicate the free space in these regions and to show which regions are now owned by each node.

SUMMARY OF THE INVENTION

It is an object of the present invention to provide improved methods and systems for management of shared resources in a distributed computing environment.

It is a further object of some aspects of the present invention to provide efficient methods for collecting and distributing information regarding availability of resources in such an environment, and particularly regarding free disk space.

In preferred embodiments of the present invention, a distributed computing system comprises a plurality of computing nodes, which have a common file system and share system resources. The system resources preferably include data storage, most preferably in the form of multiple shared disks. One of the nodes is chosen to be a coordinating node, for the purpose of gathering, maintaining and distributing free resource information ("free information"), including particularly the approximate amount of data storage space that is free throughout the system. The coordinating node makes this information available to all of the other nodes, so that applications running on any of the nodes can determine how much of the storage space or other resource is free at any given time, by means of a single query. Preferably, the coordinating node also performs other functions of the allocation manager described in U.S. Pat. No. 5,940,838.

Upon start-up of the system, the coordinating node acquires initial free information from allocation maps of all of the shared disks. Whenever one of the nodes gains control of a given allocation map region, it extracts the free information for that region from the allocation map and then updates the information based on its own allocation and de-allocation of disk space in the region. Periodically, the nodes send messages to inform the coordinating node of changes in the free information regarding allocation map regions under their control. The coordinating node uses these messages to update its picture of the free information in the entire system and notify the other nodes of this information.

Thus, whenever one of the nodes needs to ascertain the amount of free storage space in the system, it simply refers to the latest free status update that it has received from the coordinating node. To this information, the node preferably adds the results of its own allocation activity since the time of the update. The free information maintained and provided by the coordinating node is approximate, since the other nodes send their update messages only periodically. In large systems, however, allocation activity generally goes on more or less continuously, and there is typically only a minor loss in efficiency of disk space allocation due to the inaccuracy in the instantaneous free information provided by the coordinating node. On the other hand, the use of the coordinating node in this manner, to gather and distribute the approximate free information, greatly reduces the overhead associated with coordinating resource allocation in the system. The communications burden of collecting and distributing free information in this manner scales only linearly with the number of nodes in the system.

There is therefore provided, in accordance with a preferred embodiment of the present invention, a method for managing a shared resource that is allocated among nodes in a distributed computing system, the method including:

receiving periodic reports from the nodes regarding their respective allocations of the resource; and responsive to the periodic reports, determining an approximate amount of the resource that is free for further allocation.

Preferably, the shared resource includes data storage, and determining the approximate amount of the resource that is free includes determining an approximate amount of free storage capacity. Most preferably, the data storage includes a plurality of disks linked to the nodes by a network, which disks are commonly accessible to multiple ones of the nodes, and access by the nodes to the disks is controlled using a shared disk file system.

Preferably, receiving the periodic reports includes receiving information from the nodes based on an allocation map of data storage regions respectively controlled by the nodes. In a preferred embodiment, determining the approximate amount of the resource that is free includes finding, responsive to the periodic reports, one or more regions having sufficient free storage space to meet a storage need of one of the nodes, and the method further includes advising the node of the one or more regions.

Further preferably, determining the approximate amount of the resource that is free includes determining the number of free storage blocks in the regions respectively controlled by the nodes. Most preferably, determining the approximate amount of the resource that is free includes determining an exact initial number of the free storage blocks, and then updating the number approximately responsive to the periodic reports.

Preferably, receiving the periodic reports includes receiving the reports at predetermined intervals. Alternatively or additionally, receiving the periodic reports includes receiving the reports at intervals that vary from one node to another in the system. Most preferably, receiving the reports at the intervals that vary includes receiving the reports from at least one of the nodes with a frequency responsive to a measure of allocation activity by the at least one of the nodes.

In a preferred embodiment, receiving the periodic reports includes receiving a report with a timestamp, and determining the approximate amount of the resource that is free includes ignoring a report having an outdated timestamp.

Preferably, determining the approximate amount of the resource that is free includes compiling free resource information from the periodic reports to calculate a total amount of the resource that is free.

Further preferably, receiving the periodic reports includes selecting one of the nodes to serve as a coordinating node, which receives the reports from the other nodes and determines the approximate amount of the resource that is free, wherein the coordinating node reports the approximate amount of the resource that is free to the other nodes.

There is also provided, in accordance with a preferred embodiment of the present invention, apparatus for managing a shared resource that is allocated among nodes in a distributed computing system, including a processor, which is configured to communicate with the nodes in the distributed computing system so as to receive periodic reports from the nodes regarding their respective allocations of the resource, and responsive to the periodic reports, to determine an approximate amount of the resource that is free for further allocation.

There is further provided, in accordance with a preferred embodiment of the present invention, a distributed computing system, including:

a plurality of processors, configured to serve as nodes of the system;

a communication network, linking the processors; and a shared resource, accessible by the nodes via the network, wherein one of the nodes is selected to act as a coordinating node to which the other nodes periodically report on their respective allocations of the resource, and wherein the coordinating node is adapted, responsive to the reported allocations, to determine an approximate amount of the resource that is free for further allocation.

There is also provided, in accordance with a preferred embodiment of the present invention, a computer software product, including a computer-readable medium in which program instructions are stored, which instructions, when read by a computer in a distributed computing system in which a shared resource is allocated among multiple nodes, cause the computer to receive periodic reports from the nodes regarding their respective allocations of the resource, and responsive to the periodic reports, to determine an approximate amount of the resource that is free for further allocation.

In a preferred embodiment, the computer program instructions are run by the computer in conjunction with a shared disk file system, which controls access by the nodes to the disks.

The present invention will be more fully understood from the following detailed description of the preferred embodiments thereof, taken together with the drawings in which:

DETAILED DESCRIPTION OF PREFERRED EMBODIMENTS

Figure 1:
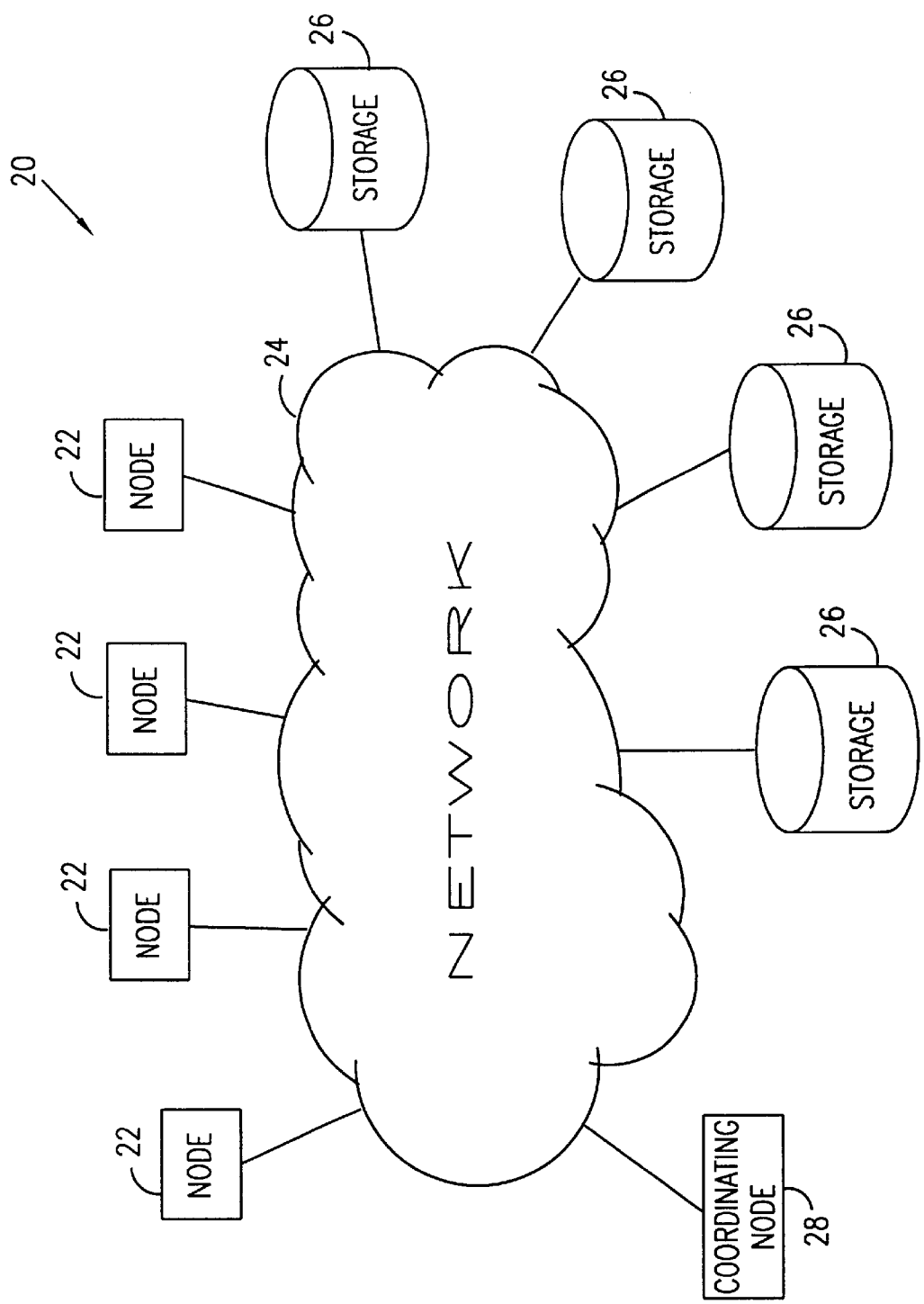
FIG. 1 is a block diagram that schematically illustrates a distributed computing system with free resource management, in accordance with a preferred embodiment of the present invention.

FIG. 1 is a block diagram that schematically illustrates a distributed computing system 20, in accordance with a preferred embodiment of the present invention. System 20 comprises a plurality of nodes 22, i.e., computers or other processing units, which are linked by a network 24 with one another and with shared resources that include data storage devices, such as magnetic disks 26. Access to disks 26 by nodes 22 is preferably controlled by a shared disk file system, most preferably as described in the above-mentioned U.S. Pat. No. 5,940,838.

Network 24 typically comprises a local area network (LAN) or interconnect, but substantially any suitable network type known in the art may be used for communicating among the nodes, disks and other resources. For example, in one preferred embodiment of the present invention, network 24 comprises a storage area network, wherein nodes 22 are connected to disks 26 by a high-speed switch, and the nodes access the disks using PSSP Virtual Shared Disk technology, as is known in the art.

One of the nodes in system 20 is chosen to be a coordinating node 28, and its identity as such is known to all of the other nodes 22. The coordinating node maintains an approximate record of free information regarding disks 26 and/or other system resources, as described in detail hereinbelow. Preferably, node 28 also performs other functions of the allocation manager described in U.S. Pat. No. 5,940,838. Software enabling node 28 to perform these functions may be downloaded to the node over network 24, or alternatively it may be furnished on computer-readable media, such as CD-ROM, for installation on node 28. Although only one coordinating node 28 is shown in FIG. 1, if more than one shared disk file system is running on system 20 (each file system with its own set of disks 26), there is preferably a coordinating node for each of the file systems. Alternatively, node 28 may run all of these file systems in parallel. Furthermore, if coordinating node 28 should fail during operation, nodes 22 preferably choose a new coordinating node from among their number, which then acquires and maintains the record of free information instead of node 28.

Figure 2:
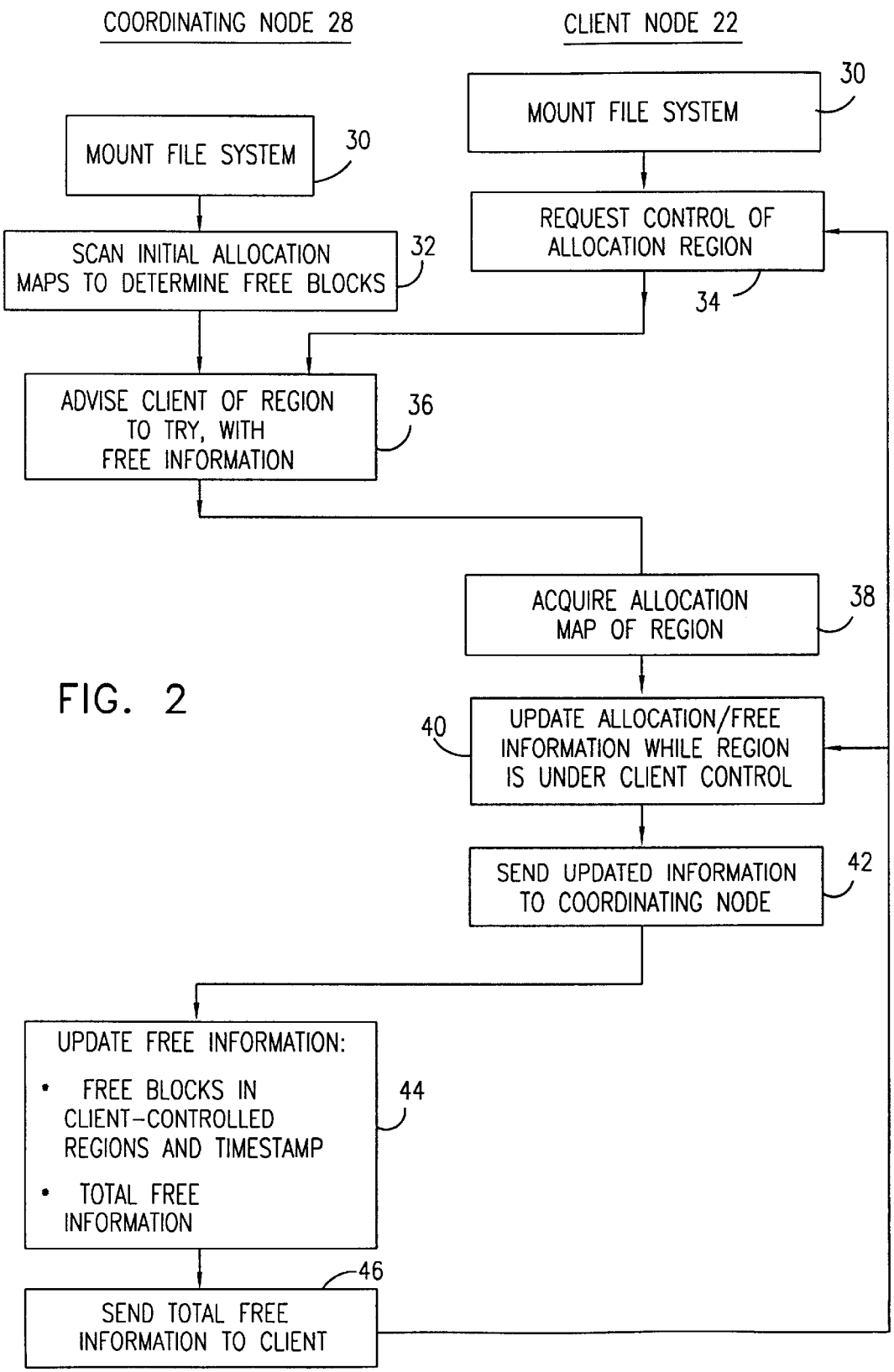
FIG. 2 is a flow chart that schematically illustrates a method for maintaining free resource information in the system of FIG. 1, in accordance with a preferred embodiment of the present invention.

FIG. 2 is a flow chart that schematically illustrates a method for controlling disk space allocation and maintaining free information, in accordance with a preferred embodiment of the present invention. The method is carried out jointly by coordinating node 28 and other nodes 22 that use disk space on disks 26 in system 20. These other nodes are referred to hereinbelow as client nodes. For simplicity of illustration, FIG. 2 relates to a single client node 22 acting in concord with coordinating node 28, but it will be understood that normally, multiple client nodes carry out their respective steps of this method in parallel.

At a mounting step 30, both the coordinating node and the client node mount the file system that the client node will use to access disks 26. As long as there is at least one client in system 20 using a particular file system, that file system will remain mounted on coordinating node 28, either externally (i.e., accessible when requested by an external client) or internally for this purpose only. At an initial scanning step 32, the coordinating node scans allocation maps of disks 26 in order to determine which areas of the disks (or inodes) are in use, and which are free. The coordinating node thus has at this point a complete picture of the free space on each available region of every disk and can calculate—the exact total amount of free disk space in the system. This information is made available by the coordinating node throughout system 20. Client nodes, as well as applications running on the client nodes, can thus receive the information at minimal overhead cost. The coordinating node continues to make this free information available while system 20 is running, with periodic updates as described hereinbelow.

At a request step 34, client node 22 seeks a new region on disks 26 in which it can allocate blocks for storage of data, for example, data generated in the course of running an application program on node 22. For this purpose, the node must find a region that is not currently being accessed by another node. The node generally needs to know how much free space is available in the region and, possibly, on all of disks 26 in system 20. Node 22 therefore passes a free information request to coordinating node 28. In reply, at a transfer step 36, the coordinating node advises node 22 as to which region on disks 26 the node should try next, along with the relevant free information. If there is insufficient free space in the first region received by node 22 for all of the data to be generated, but there is still sufficient free space in other regions, node 22 will proceed with the application program. On the other hand, if there is insufficient free disk space in system 20, the node will return an "insufficient disk space" message to the application.

In order to proceed with allocation of the disk space, at a map allocation step 38, client node 22 takes control of the new region and acquires an accurate, up-to-date allocation map of the region. Node 22 scans the map to determine the exact amount of free space in the region. At an allocation updating step 40, as the client node allocates or de-allocates disk space under its control, it updates its own record of the free information regarding the region.

Periodically, at a send update step 42, client node 22 sends an update message to coordinating node 28, including current free information regarding all regions of disks 26 that are under the client's control. Preferably, a time stamp is sent together with the message. Similar messages are sent by all of nodes 22 in system 20 that use disks 26. The more frequently these update messages are sent, the more accurate the records of global free space kept by coordinating node 28 will be. On the other hand, sending update messages too often may clog communications and add to the operating overhead of system 20. Each node sends its update messages to the coordinating node at a certain frequency, independent of any scanning by the coordinating node. Optionally, the frequency of sending update messages varies from node to node, typically depending on the respective levels of disk allocation activity by the different nodes. The frequency of sending the update messages may be fixed, or it may vary dynamically depending on the level of disk allocation activity and/or other parameters.

In one preferred embodiment, the update messages are sent on a fixed schedule, but a maximum allocation threshold is also set. If one of nodes 22 allocates a number of storage blocks greater than the threshold before the time has come to send the next periodic update message to coordinating node 28, that node 22 must send an immediate, unscheduled update to the coordinating node. In this manner, the global free space records of node 28 are maintained roughly within a predefined margin of error.

Coordinating node 28 uses the free update information from client node 22, at a free information updating step 44, to update its own records of the number of free blocks in the disk regions controlled by the client node. Preferably, the coordinating node actually updates the information in its records only if the time stamp on the update message from client node 22 is later than the preceding update received from a client node and used by the coordinating node. Alternatively, if the clocks of all of the nodes in system 20 are not mutually synchronized, the coordinating node can ignore the time stamps, since in any event errors due to processing update messages out of order are not cumulative. Based on the records of all of the disk regions, the coordinating node also generates an estimate of the total free space available on disks 26.

At an inform client step 46, coordinating node 28 conveys the free information from its own records to client node 22.

This step typically takes place whenever the client node informs the coordinating node of its own local state, so that steps 42 and 46 can in a sense be thought of as a single, bidirectional information exchange step. It may also occur when a process running on one of the client nodes asks to check periodically on the amount of free space in system 20. If the client node asks to check the free information while itself allocating disk space in a region under its control, some confusion may occur since the coordinating node will not report any change in the free disk space until it has received an update message (step 42) and processed it (step 44). To prevent such confusion, the client node preferably maintains its own interim counter of free information, which it combines with the latest free information that it has received from the coordinating node. Every time the client node receives new information from the coordinating node, the interim counter is zeroed.

The approximate free information provided by coordinating node 28 is believed to be adequate for nearly all disk allocation needs in distributed computing systems such as system 20, since in any case there is a large amount of disk space in the system, and allocation activity goes on almost continuously. Nevertheless, to the extent that exact free information is needed by some application or other process running on one (or more) of nodes 22, that node can still request and receive real-time information regarding disk allocation from the other nodes 22. The requesting node can then keep track of the exact free information using one of the methods described in the Background of the Invention, for example.

Although preferred embodiments are described hereinabove with reference to the shared disk file system of the above-mentioned U.S. Pat. No. 5,940,838, it will be understood that the principles of the present invention are similarly applicable to other parallel or distributed file systems that use shared resources. These shared resources most commonly comprise disk storage, but the principles of the present invention may also be applied to management of shared memory, as well as to shared management of other system resources.

It will be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. A method for managing a shared resource that is allocated among nodes in a distributed computing system, the method comprising:
   selecting one of the nodes to serve as a coordinating node;
   receiving periodic reports at the coordinating node from the other nodes regarding their respective allocations of the resource, independently of any scanning of the other nodes by the coordinating node; and
   responsive to the periodic reports, determining at the coordinating node an approximate amount of the resource that is free for further allocation.

2. A method according to claim 1, wherein the shared resource comprises data storage, and wherein determining the approximate amount of the resource that is free comprises determining an approximate amount of free storage capacity.

3. A method according to claim 2, wherein the data storage comprises a plurality of disks linked to the nodes by a network, which disks are commonly accessible to multiple ones of the nodes.

4. A method according to claim 3, wherein access by the nodes to the disks is controlled using a shared disk file system.

5. A method according to claim 2, wherein receiving the periodic reports comprises receiving information from the nodes based on an allocation map of data storage regions respectively controlled by the nodes.

6. A method according to claim 5, wherein determining the approximate amount of the resource that is free comprises finding, responsive to the periodic reports, one or more regions having sufficient free storage space to meet a storage need of one of the nodes, and comprising advising the node of the one or more regions.

7. A method according to claim 5, wherein determining the approximate amount of the resource that is free comprises determining the number of free storage blocks in the regions respectively controlled by the nodes.

8. A method according to claim 7, wherein determining the approximate amount of the resource that is free comprises determining an exact initial number of the free storage blocks, and then updating the number approximately responsive to the periodic reports.

9. A method according to claim 1, wherein receiving the periodic reports comprises receiving the reports at predetermined intervals.

10. A method according to claim 1, wherein receiving the periodic reports comprises receiving the reports at intervals that vary from one node to another in the system.

11. A method according to claim 10, wherein receiving the reports at the intervals that vary comprises receiving the reports from at least one of the nodes with a frequency responsive to a measure of allocation activity by the at least one of the nodes.

12. A method according to claim 1, wherein receiving the periodic reports comprises receiving a report with a timestamp, and wherein determining the approximate amount of the resource that is free comprises ignoring a report having an outdated timestamp.

13. A method according to claim 1, wherein determining the approximate amount of the resource that is free comprises compiling free resource information from the periodic reports to calculate a total amount of the resource that is free.

14. A method according to claim 1, wherein the coordinating node reports the approximate amount of the resource that is free to the other nodes.

15. Apparatus for managing a shared resource that is allocated among nodes in a distributed computing system, comprising a processor, which is configured to communicate with the nodes in the distributed computing system so as to receive periodic reports from the nodes regarding their respective allocations of the resource independently of any scanning of the other nodes by the processor, and responsive to the periodic reports, to determine an approximate amount of the resource that is free for further allocation.

16. A distributed computing system, comprising:
   a plurality of processors, configured to serve as nodes of the system;
   a communication network, linking the processors; and
   a shared resource, accessible by the nodes via the network,
   wherein one of the nodes is selected to act as a coordinating node, and
   wherein the other nodes periodically report on their respective allocations of the resource independently of any scanning of the other nodes by the coordinating node, and wherein the coordinating node is adapted, responsive to the reported allocations, to determine an approximate amount of the resource that is free for further allocation.

17. A system according to claim 16, wherein the shared resource comprises a data storage resource, and wherein the coordinating node determines an approximate amount of free data storage capacity.

18. A system according to claim 17, wherein the data storage resource comprises a plurality of disks linked to the nodes by a network, which disks are commonly accessible to multiple ones of the nodes.

19. A system according to claim 18, wherein access by the nodes to the disks is controlled using a shared disk file system.

20. A system according to claim 17, wherein the coordinating node is adapted to receive information from the nodes based on an allocation map of data storage regions respectively controlled by the nodes.

21. A system according to claim 20, wherein the coordinating node determines, based on the reported allocations, the number of free storage blocks in the region respectively controlled by the nodes.

22. A system according to claim 21, wherein the coordinating node initially determines an exact number of the free storage blocks, and then updates the number approximately responsive to the periodic reports.

23. A system according to claim 16, wherein the coordinating node compiles free resource information from the periodic reports to calculate a total amount of the resource that is free.

24. A system according to claim 16, wherein the coordinating node reports the approximate amount of the resource that is free to the other nodes.

25. A computer software product, comprising a computer-readable medium in which program instructions are stored, which instructions, when read by a computer in a distributed computing system in which a shared resource is allocated among multiple nodes, cause the computer to receive periodic reports from the nodes regarding their respective allocations of the resource independently of any scanning of the other nodes by the computer, and responsive to the periodic reports, to determine an approximate amount of the resource that is free for further allocation.

26. A product according to claim 25, wherein the shared resource comprises a data storage resource, and wherein the program instructions cause the computer to determine an approximate amount of free data storage capacity.

27. A product according to claim 26, wherein the data storage resource comprises a plurality of disks linked to the nodes by a network, which disks are commonly accessible to multiple ones of the nodes.

28. A product according to claim 27, wherein the computer program instructions are run by the computer in conjunction with a shared disk file system, which controls access by the nodes to the disks.

29. A product according to claim 25, wherein the instructions further cause the computer to report the approximate amount of the resource that is free to the nodes.

30. A method for managing a shared resource that is allocated among nodes in a distributed computing system, the method comprising:

receiving periodic reports from the nodes, at intervals that vary from one node to another in the system, regarding their respective allocations of the shared resource; and responsive to the periodic reports, determining an approximate amount of the shared resource that is free for further allocation.

31. A method according to claim 30, wherein receiving the reports at the intervals that vary comprises receiving the reports from at least one of the nodes with a frequency responsive to a measure of allocation activity by the at least one of the nodes.

* * * * *